United States Patent
Choi et al.

(10) Patent No.: US 12,228,294 B2
(45) Date of Patent: Feb. 18, 2025

(54) HOT WATER SUPPLYING APPARATUS AND METHOD FOR CONTROLLING SAME

(71) Applicant: KYUNGDONG NAVIEN CO., LTD., Pyeongtaek-si (KR)

(72) Inventors: Hyuk Choi, Seoul (KR); Jung Keom Kim, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 303 days.

(21) Appl. No.: 16/770,036

(22) PCT Filed: Dec. 4, 2018

(86) PCT No.: PCT/KR2018/015222
§ 371 (c)(1),
(2) Date: Jun. 4, 2020

(87) PCT Pub. No.: WO2019/124820
PCT Pub. Date: Jun. 27, 2019

(65) Prior Publication Data
US 2020/0386417 A1   Dec. 10, 2020

(30) Foreign Application Priority Data

Dec. 21, 2017  (KR) .................. 10-2017-0177337

(51) Int. Cl.
*F24D 19/10* (2006.01)
*F24H 9/20* (2022.01)
(Continued)

(52) U.S. Cl.
CPC ....... *F24D 19/1051* (2013.01); *F24H 9/2007* (2013.01); *F24H 15/176* (2022.01);
(Continued)

(58) Field of Classification Search
None
See application file for complete search history.

(56) References Cited

U.S. PATENT DOCUMENTS

| | | | |
|---|---|---|---|
| 6,962,162 B2* | 11/2005 | Acker | ................. F24D 19/1051 137/357 |
| 9,928,724 B2* | 3/2018 | Alcorn | ..................... G01F 25/10 |
| 2014/0229022 A1* | 8/2014 | Deivasigamani | ... F24D 17/0036 700/282 |

FOREIGN PATENT DOCUMENTS

| | | |
|---|---|---|
| CN | 106642729 A | 5/2017 |
| KR | 1019940011226 B1 | 11/1994 |

(Continued)

OTHER PUBLICATIONS

International Search Report of PCT/KR2018/015222, Mar. 7, 2019, English translation.

*Primary Examiner* — Steven B McAllister
*Assistant Examiner* — John E Bargero
(74) *Attorney, Agent, or Firm* — STIP Law Group, LLC

(57) ABSTRACT

The purpose of the present invention is to provide a hot water supplying apparatus that enables a user to conveniently execute a hot water control function in a location where a faucet is located, and a method for controlling the same. The hot water supplying apparatus for achieving said purpose comprises: a flow rate detection unit for detecting a flow rate change of water supplied by turning a faucet on/off and outputting a flow rate signal; and a control unit for, when the flow rate detection unit detects a flow rate change in a specific pattern, controlling a preset hot water control function to be executed according to the flow rate change pattern.

10 Claims, 4 Drawing Sheets

(51) Int. Cl.
  *F24H 15/176* (2022.01)
  *F24H 15/238* (2022.01)
  *F24H 15/269* (2022.01)
  *F24H 15/36* (2022.01)
  *F24H 15/281* (2022.01)
  *F24H 15/335* (2022.01)
  *G05D 23/19* (2006.01)

(52) U.S. Cl.
  CPC ......... *F24H 15/238* (2022.01); *F24H 15/269* (2022.01); *F24H 15/36* (2022.01); *F24D 2200/04* (2013.01); *F24D 2220/0207* (2013.01); *F24D 2220/0271* (2013.01); *F24D 2220/044* (2013.01); *F24H 15/281* (2022.01); *F24H 15/335* (2022.01); *G05D 23/19* (2013.01)

(56) References Cited

FOREIGN PATENT DOCUMENTS

| | | | |
|---|---|---|---|
| KR | 1019990002327 | A | 1/1999 |
| KR | 1020000004986 | A | 1/2000 |
| KR | 101081313 | B1 | 11/2011 |
| KR | 1020130126299 | A | 11/2013 |
| KR | 1020140075470 | A | 6/2014 |
| KR | 200479482 | Y1 | 2/2016 |
| KR | 101670779 | B1 | 10/2016 |
| RU | 119857 | U1 | 8/2012 |
| RU | 2470235 | C2 | 12/2012 |
| RU | 144388 | U1 | 8/2014 |

\* cited by examiner

[FIG. 1]
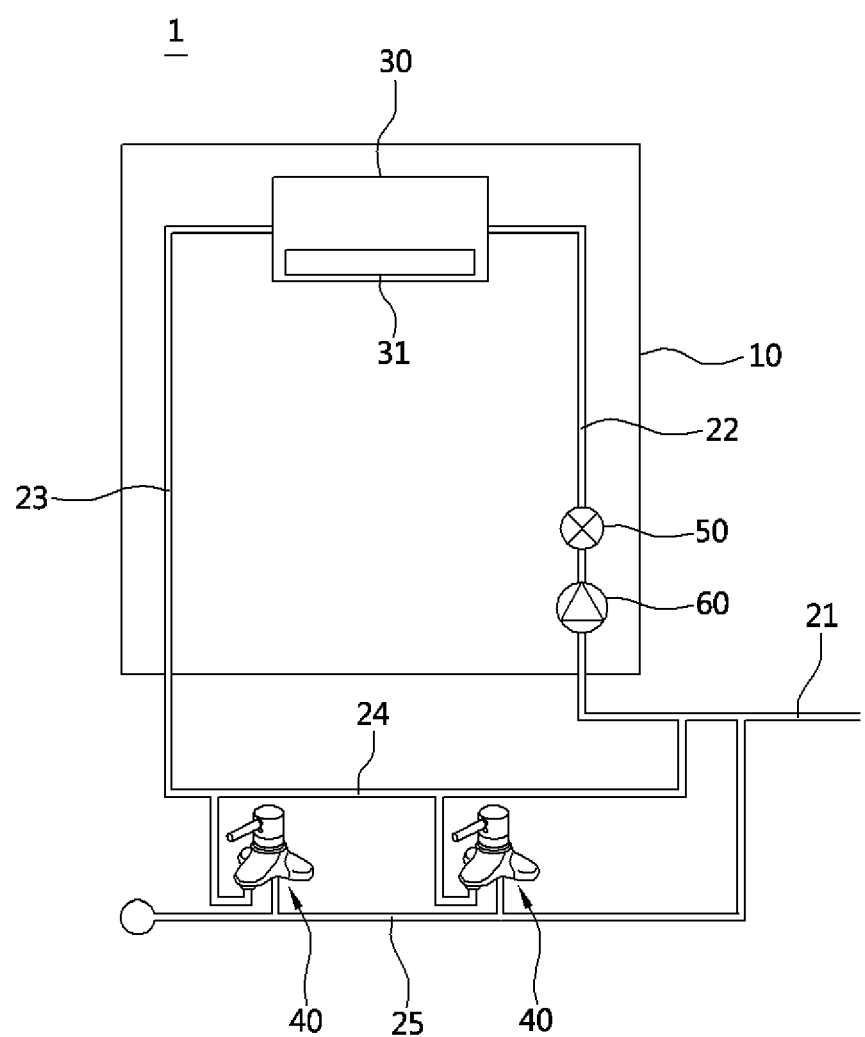

[FIG. 2]
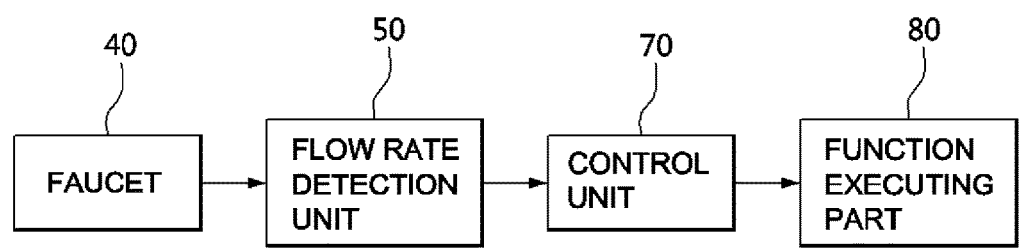
[FIG. 3]
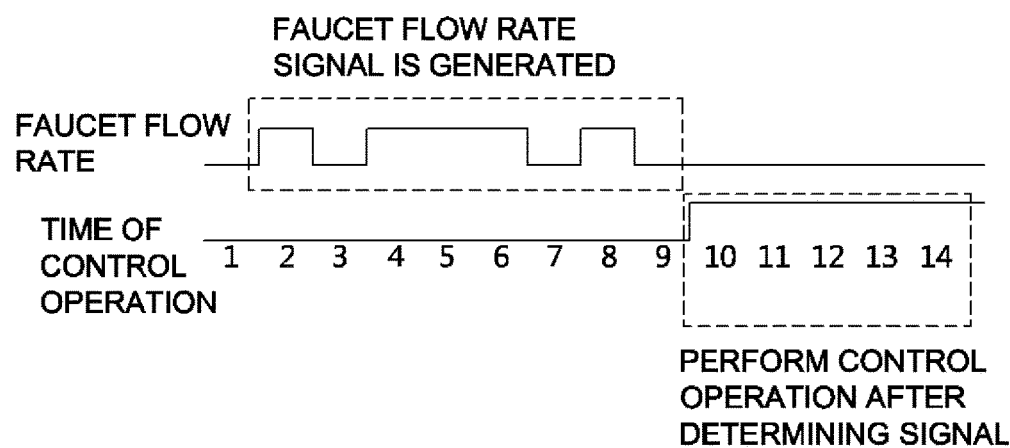

[FIG. 4]
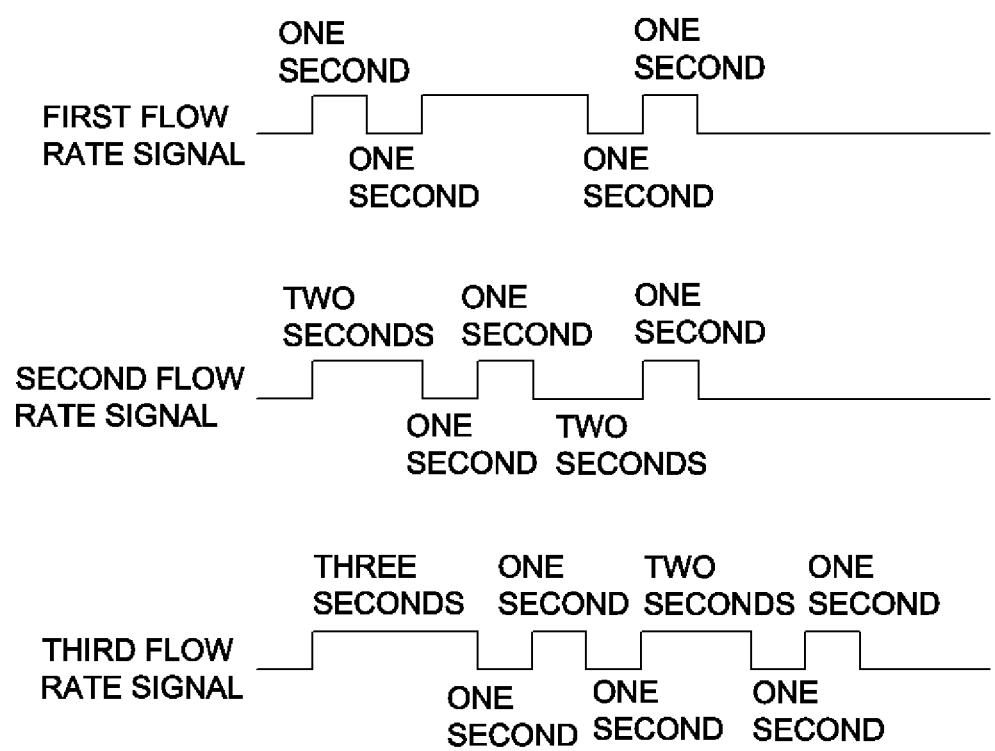

[FIG. 5]
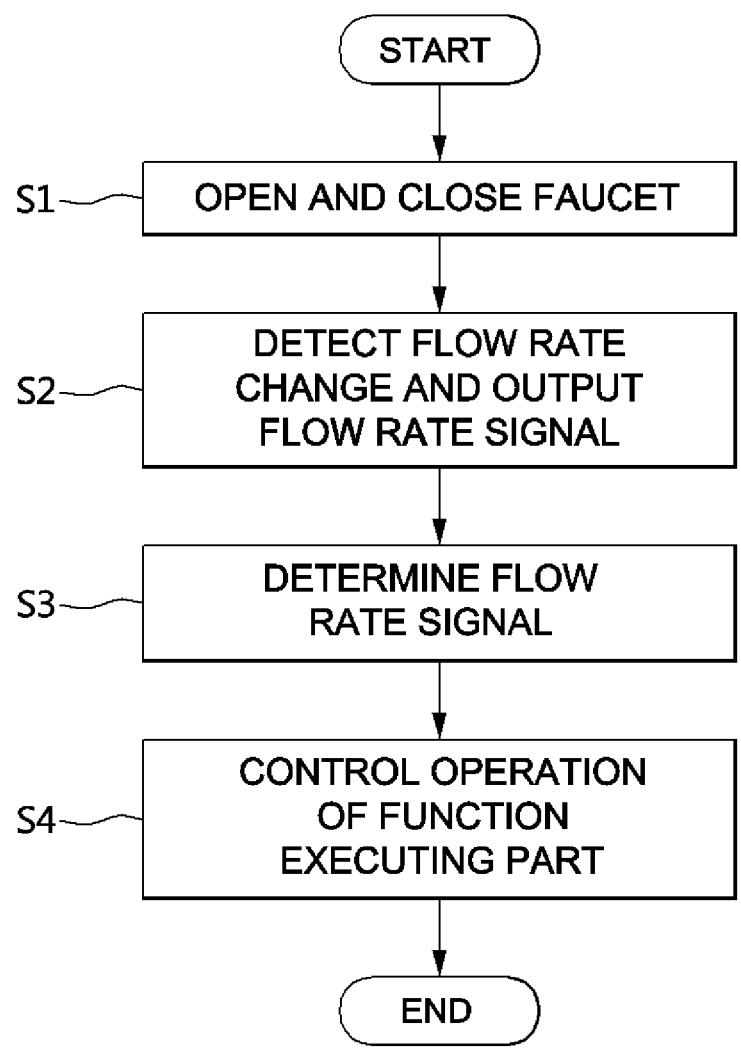

HOT WATER SUPPLYING APPARATUS AND METHOD FOR CONTROLLING SAME

CROSS-REFERENCE TO RELATED APPLICATIONS

This application is the U.S. National Phase under 35 U.S.C. § 371 of International Application No. PCT/KR2018/015222 filed on Dec. 4, 2018, which in turn claims the benefit of Korean Application No. 10-2017-0177337, filed on Dec. 21, 2017, the disclosures of which are incorporated by reference into the present application.

TECHNICAL FIELD

The present invention relates to a hot water supplying apparatus and a method of controlling the same, and more specifically, to a hot water supplying apparatus in which a user opens and closes a faucet in a specific pattern and thus a hot water control function is conveniently executed at a position where the faucet is located and a method of controlling the same.

BACKGROUND ART

A hot water supplying apparatus is an apparatus which heats direct water to a set temperature within a short time so that a user can conveniently use hot water.

The hot water supplying apparatus uses oil or gas as fuel to combust through a burner and then heat water using the combustion heat generated in the combustion process, and provide the heated water according to a user's needs.

Generally, in a water heater or boiler, a place where hot water is used is spatially separated from the place where the apparatus is controlled. For example, the place where hot water is used is mainly a bathroom or a kitchen whereas the place where the apparatus is controlled can be a living room, a wall of a room, a boiler room, a veranda, or the like.

As described above, since the place where hot water is used and the place where the hot water supplying apparatus is controlled are spatially separated, there is inconvenience that the user cannot execute a hot water control function in the place where hot water is used, and the user can use the hot water only after setting a specific hot water control function at the control place and then moving to the use place.

As the prior art related to the hot water supplying apparatus and a method of controlling the same, in Korean Application Utility Model No. 20-0479482, a faucet device provided with a cold and hot water operation switch capable of adjusting a temperature and a flow rate of a water heater at a faucet is disclosed, and in Korean Laid-Open Patent No. 1994-0011226, a control apparatus, such as a water heater or the like, which controls a heating means on the basis of pulse signals which generate a pulse according to a flow rate through a water path including a heat exchanger is disclosed.

DISCLOSURE

Technical Problem

The present invention is directed to providing a hot water supplying apparatus in which a user may conveniently execute a hot water control function at a position where a faucet is located and a method of controlling the same.

Technical Solution

One aspect of the present invention provides a hot water supplying apparatus including: a flow rate detection unit configured to detect a flow rate change of water supplied due to opening and closing of a faucet and output a flow rate signal; and a control unit configured to perform control so that a preset hot water control function is executed according to a flow rate change pattern when the flow rate change in a specific pattern is detected in the flow rate detection unit.

The flow rate detection unit may detect the time and number of times the faucet is opened and closed to output a flow rate signal in the specific pattern.

The control unit may determine the flow rate signal output from the flow rate detection unit as a signal for the hot water control function.

The hot water control function may include a function of turning on or off the operation of the hot water supplying apparatus.

The hot water control function may include a hot water preheating function.

The hot water control function may include a hot water setting temperature changing function.

Another aspect of the present invention provides a method of controlling a hot water supplying apparatus including: opening and closing a faucet at set times and a set number of times according to a preset hot water control function; detecting a flow rate change due to opening and closing of the faucet to output a flow rate signal; and performing control so that the preset hot water control function is executed according to a flow rate change pattern when the flow rate change in a specific pattern is detected on the basis of the flow rate signal.

The hot water control function may include a function of turning on or off the operation of the hot water supplying apparatus.

The hot water control function may include a hot water preheating function.

The hot water control function may include a hot water setting temperature changing function.

Advantageous Effects

In a hot water supplying apparatus according to the present invention and a method of controlling the same, since a user can execute a hot water control function at a place where hot water is used and a faucet is located by opening and closing the faucet at set times and a set number of times according to the hot water control function without installing a separate apparatus for setting the hot water control function at the place where hot water is used, the user can reduce the trouble of moving to a control place far away from the faucet to operate the hot water supplying apparatus, and thus the convenience of using the hot water supplying apparatus can be improved.

DESCRIPTION OF DRAWINGS

FIG. 1 is a configuration diagram of a hot water supplying apparatus according to one embodiment of the present invention.

FIG. 2 is a control block diagram of the hot water supplying apparatus according to one embodiment of the present invention.

FIG. 3 is a graph illustrating an execution time of a control operation according to a faucet flow rate signal of the present invention.

FIG. 4 is a graph exemplifying embodiments of flow rate signals in a specific pattern.

FIG. 5 is a flow chart of a method of controlling the hot water supplying apparatus of the present invention.

[Reference numerals]

| | |
|---|---|
| 1: | hot water supplying apparatus |
| 10: | water heater |
| 21: | direct water pipe |
| 22: | direct water pipe in water heater |
| 23: | hot water pipe in water heater |
| 24: | hot water preheating circulation pipe |
| 25: | direct water pipe at faucet |
| 30: | heat exchanger |
| 31: | burner |
| 40: | faucet |
| 50: | flow rate detection unit |
| 60: | pump |
| 70: | control unit |
| 80: | function executing part |

MODES OF THE INVENTION

Hereinafter, the configuration and operation of a preferred embodiment of the present invention will be described with reference to the accompanying drawings.

Referring to FIG. 1, a hot water supplying apparatus 1 according to one embodiment of the present invention may include a water heater 10 which heats direct water to supply hot water, a direct water pipe 21 and a direct water pipe 22 in the water heater which supply the direct water to the water heater 10, a heat exchanger 30 which generates the hot water by heating the direct water introduced through the direct water pipe 22 in the water heater using the combustion heat of a burner 31, a hot water pipe 23 in the water heater which supplies the hot water heated in the heat exchanger 30 to a faucet 40, a hot water preheating circulation pipe 24 forming a circulation path of the hot water by connecting the hot water pipe 23 in the water heater and the direct water pipe 21, a direct water pipe 25 at the faucet which supplies the direct water from the direct water pipe 21 to the faucet 40, a flow rate detection unit 50 which detects a flow rate of the introduced direct water, and a pump 60 which circulates water to preheat the hot water. In FIG. 1, as an embodiment of the hot water supplying apparatus 1, although a case in which the water heater 10 is applied is illustrated, the hot water supplying apparatus 1 of the present invention may also be applied to a boiler which supplies hot water.

Referring to FIG. 2, the hot water supplying apparatus 1 of the present invention includes the flow rate detection unit 50 which detects a flow rate change of the water (direct water) supplied due to opening and closing of the faucet 40 and outputs a flow rate signal, and a control unit 70 which controls a function executing part 80 which executes a preset hot water control function according to a flow rate change pattern when the flow rate change in a specific pattern is detected in the flow rate detection unit 50.

The flow rate detection unit 50 may be a flow rate (flow) switch or flow rate sensor, and detects times at which the faucet 40 is opened and closed and the number of times of opening and closing the faucet 40 to output a flow rate signal in the specific pattern.

The control unit 70 controls an operation of the function executing part 80 by determining whether the flow rate signal output from the flow rate detection unit 50 is a signal for the hot water control function.

The function executing part 80 is a component of the water heater or boiler which executes the hot water control function. For example, the function executing part 80 may be a power switch part which executes a function of turning on or off the operation of the water heater or boiler, the burner 31 and the pump 60 which execute the hot water preheating function of the water heater or boiler, a temperature setting part of a room controller which executes a hot water setting temperature changing function of the water heater or boiler, or the like.

Referring to FIG. 3, when a hot water user opens and closes the faucet 40, the flow rate of the water which flows along the pipes 21, 22, 23, and 24 to which the water (direct water) is supplied is changed, the flow rate detection unit 50 outputs a faucet flow rate signal in the specific pattern in response to the flow rate change, and the control unit 70 controls the operation of the function executing part 80 so that the hot water control function is executed based on the faucet flow rate signal output from the flow rate detection unit 50.

As an embodiment, referring to FIG. 4, a first flow rate signal is a case in which the function of turning on or off the water heater or boiler is executed, and may correspond to a case in which the faucet 40 is opened for one second, closed for one second, opened for three seconds, closed for one second, and opened for one second. As another embodiment, a second flow rate signal is a case in which the hot water preheating function of the water heater or boiler is executed, and may correspond to a case in which the faucet 40 is opened for two seconds, closed for one second, opened for one second, closed for two seconds, and opened for one second. As still another embodiment, a third flow rate signal is a case in which the hot water setting temperature changing function of the water heater or boiler is executed, and may correspond to a case in which the faucet 40 is opened for three seconds, closed for one second, opened for one second, closed for one second, opened for two seconds, closed for one second, and opened for one second.

The above embodiments are only possible examples of the times at which the faucet 40 are opened and closed and the number of times of opening and closing the faucet 40, and the times at which faucet 40 are opened and closed and the number of times of opening and closing the faucet 40 may be variously modified from the above. However, the times at which faucet 40 are opened and closed and the number of times of opening and closing the faucet 40 may be set as an opening and closing pattern not frequently shown when using hot water in everyday life to be determined as a hot water control function signal.

The hot water control function may include the function of turning on or off the operation of the hot water supplying apparatus 1, the hot water preheating function, the hot water setting temperature changing function, and the like.

Referring to FIG. 5, a method of controlling the hot water supplying apparatus according to the present invention includes opening and closing the faucet 40 at set times and a set number of times according to a preset hot water control function (S1), detecting a flow rate change due to opening and closing of the faucet 40 to output a flow rate signal (S2), and determining whether the flow rate signal is a signal for the hot water control function (S3), and controlling the operation of the function executing part 80 so that the hot water control function is executed (S4).

The hot water control function may include a function of turning on or off the operation, a hot water preheating function, the hot water setting temperature changing function, and the like of the hot water supplying apparatus 1.

However, the hot water control function may be a function included in various types of hot water supplying apparatuses including the water heater or boiler, and may also be modified into various functions helpful for using hot water in addition to the exemplified functions.

As described above, according to the present invention, since the user opens and closes the faucet 40 at set times and a set number of times according to the preset hot water control function, and thus the hot water control function may be conveniently executed at a position where the faucet 40 is located, the user may reduce the trouble of moving to a control place far away from the faucet 40 to execute the hot water control function, and thus the convenience of using the hot water supplying apparatus 1 may be improved.

As described above, the present invention is not limited to the above-described embodiments, and it will be apparent to those skilled in the art that the present invention may be modified without departing from the spirit of the present invention in the claims, and such a modification is included in the scope of the present invention.

The invention claimed is:

1. A hot water supplying apparatus comprising:
   a water heater that heats direct water to form hot water, comprising a heat exchanger and a flow rate detection unit;
   a faucet;
   a first direct water pipe supplying direct water;
   a second direct water pipe connected between the heat exchanger and the first direct water pipe to supply the direct water from the first direct water pipe to the heat exchanger;
   a hot water pipe connected between the heat exchanger and the faucet to supply the hot water from the heat exchanger to the faucet;
   a third direct water pipe connected between the faucet and the first direct water pipe to supply the direct water from the first direct water pipe to the faucet; and
   a controller comprising a function executing part, wherein,
   the flow rate detection unit is located in the second direct water pipe, and thea flow rate detection unit is configured to detect a flow rate change and a flow rate change pattern of the flow rate change, and to output a flow rate signal in the flow rate change pattern, and the flow rate change pattern is detected from the direct water flowing through the second direct water pipe and
   the flow rate change pattern is a pattern of the flow rate change measured over time in seconds while a user closes and opens the faucet multiple times,
   the flow rate change pattern shows that the flow rate signal changes ON or OFF with a duration when the faucet is open or closed, respectively,
   the controller is configured to determine whether the flow rate change pattern generated by the user matches a preset specific pattern corresponding to a preset hot water control function, and the function executing part is configured to execute the preset hot water control function when the flow rate change pattern matches the preset specific pattern, such that the user executes the preset hot water control function by opening and closing the faucet to create the flow rate change pattern.

2. The hot water supplying apparatus of claim 1, wherein the flow rate detection unit is configured to detect the duration and the number of times the faucet is opened and closed as a function of time and to output the flow rate signal corresponding to the flow rate change pattern.

3. The hot water supplying apparatus of claim 1, wherein the controller determines if the flow rate signal is a signal corresponding to the preset hot water control function.

4. The hot water supplying apparatus of claim 1, wherein the preset hot water control function includes a function of turning on or off the operation of the hot water supplying apparatus.

5. The hot water supplying apparatus of claim 1, wherein the preset hot water control function includes a hot water preheating function.

6. The hot water supplying apparatus of claim 1, wherein the preset hot water control function includes a hot water setting temperature changing function.

7. A method of controlling a hot water supplying apparatus comprising:
   opening and closing a faucet at a set duration within a few seconds multiple times by a user to generate a flow rate change pattern corresponding to a preset hot water control function;
   detecting a flow rate change and a flow rate change pattern of direct water due to the user's opening and closing of the faucet, wherein the flow rate change and the flow rate change pattern are detected by a controller from the direct water before heating supplied from outside of the hot water supplying apparatus,
   outputting a flow rate signal according to the flow rate change pattern by the controller, wherein the flow rate change pattern is a pattern of the flow rate change measured over time while closing or opening of the faucet in seconds and the flow rate change pattern shows that the flow rate signal changes ON or OFF with a duration when the faucet is open or closed, respectively;
   determining the flow rate change pattern from the flow rate signal by the controller; and
   executing a preset hot water control function by the controller when the flow rate change pattern matches a preset specific pattern corresponding to the preset hot water control function.

8. The method of claim 7, wherein the preset hot water control function includes a function of turning on or off the operation of the hot water supplying apparatus.

9. The method of claim 7, wherein the preset hot water control function includes a hot water preheating function.

10. The method of claim 7, wherein the preset hot water control function includes a hot water setting temperature changing function.

* * * * *